United States Patent
Barbosa et al.

(10) Patent No.: US 9,812,946 B2
(45) Date of Patent: Nov. 7, 2017

(54) POWER CONVERTER AND OPERATING METHOD THEREOF

(71) Applicant: DELTA ELECTRONICS, INC., Taoyuan (TW)

(72) Inventors: Peter Mantovanelli Barbosa, Taoyuan (TW); Chia-Hsun Wu, Taoyuan (TW); Chih-Chiang Chan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 51 days.

(21) Appl. No.: 15/014,025

(22) Filed: Feb. 3, 2016

(65) Prior Publication Data
US 2017/0222541 A1    Aug. 3, 2017

(51) Int. Cl.
*H02M 1/32*    (2007.01)
*H02M 1/088*    (2006.01)

(52) U.S. Cl.
CPC .............. *H02M 1/32* (2013.01); *H02M 1/088* (2013.01)

(58) Field of Classification Search
CPC .......... H02M 1/08; H02M 1/088; H02M 1/32; H02M 1/36; H02M 2001/0067; H02M 2001/0074
See application file for complete search history.

(56) References Cited

U.S. PATENT DOCUMENTS

| 8,242,704 | B2 * | 8/2012 | Lethellier | .......... | H05B 33/0815 |
| | | | | | 315/276 |
| 2008/0304300 | A1 | 12/2008 | Raju et al. | | |
| 2010/0314937 | A1 | 12/2010 | Jacobson et al. | | |
| 2013/0083576 | A1 * | 4/2013 | Gan | ....... | H02M 1/088 |
| | | | | | 363/123 |
| 2013/0313906 | A1 * | 11/2013 | Gupta | ...... | H02M 1/00 |
| | | | | | 307/39 |
| 2016/0197547 | A1 * | 7/2016 | Park | ....... | H02M 7/483 |
| | | | | | 363/50 |

FOREIGN PATENT DOCUMENTS

| CN | 101882863 B | 11/2012 |
| DE | 102010039640 A1 | 2/2012 |
| DE | 102011004328 A1 | 8/2012 |
| TW | 201320566 A1 | 5/2013 |

OTHER PUBLICATIONS

Ji, Z., Zhao, J., Sun, Y., Yao, X., & Zhu, Z.,"Fault-Tolerant Control of Cascaded H-Bridge Converters Using Double Zero-Sequence Voltage Injection and DC Voltage Optimization.", Journal of Power Electronics,vol. 14, No. 5, Sep. 2014,pp. 946-956.
Choudhary, V., Ledezma, E., Ayyanar, R., & Button, R. M., "Fault Tolerant Circuit Topology and Control Method for Input-Series and Output-Parallel Modular DC-DC Converters.", IEEE Transactions on Power Electronics, vol. 23, No. 1, Jan. 2008, pp. 402-411.

* cited by examiner

*Primary Examiner* — Matthew Nguyen
(74) *Attorney, Agent, or Firm* — CKC & Partners Co., Ltd.

(57) ABSTRACT

A power converter and a method are disclosed. The power converter includes a plurality of converting modules and a plurality of switching circuits. Each of the converting modules includes a bypass element configured to be shorted when a fault occurs. The switching circuits are electrically coupled in series to each other and electrically coupled in parallel to the converting modules respectively. Any one of the switching circuits is configured to be shorted when the bypass element of the corresponding converting module is shorted.

20 Claims, 5 Drawing Sheets

POWER CONVERTER AND OPERATING METHOD THEREOF

BACKGROUND

Technical Field

The present disclosure relates to a power converter, and in particular, to a power converter having cascaded power modules.

Description of Related Art

Some power converter systems use cascaded standard modules to operate with medium voltage inputs, and extra standard modules provide system redundancy when some modules fail during operations.

However, in order to remove the failed modules and install a new module, the converter system has to be shutdown entirely for the safety issues, and the power converter system cannot provide power continuously during the replacing process.

SUMMARY

One aspect of the present disclosure is a power converter. The power converter includes a plurality of converting modules and a plurality of switching circuits. Each of the converting modules includes a bypass element configured to be shorted when a fault occurs. The switching circuits are electrically coupled in series to each other and electrically coupled in parallel to the converting modules respectively. Any one of the switching circuits is configured to be shorted when the bypass element of the corresponding converting module is shorted.

Another aspect of the present disclosure is a power converter. The power converter includes a first converting module, a second converting module and a power converter shelf. The second converting module is electrically coupled to the first converting module. The power converter shelf includes a first switching circuit, a second switching circuit, and a control circuit. The first switching circuit is electrically coupled to the first converting module in parallel. The second switching circuit is electrically coupled to the second converting module in parallel and electrically coupled to the first switching circuit in series. The control circuit is configured to output a bypass signal to turn on the first switching circuit when the first converting module outputs a fault signal to the control circuit, and output the bypass signal to turn on the second switching circuit when the second converting module outputs the fault signal to the control circuit.

Yet another aspect of the present disclosure is a method. The method includes receiving a fault signal, by a control circuit, from one of a plurality of converting modules; and outputting a bypass signal, by the control circuit, in response to the fault signal to a switching circuit electrically coupled to the corresponding converting module in parallel so as to short the switching circuit. The control circuit and the switching circuits are arranged in a power shelf, and the converting modules are installed in the power shelf.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
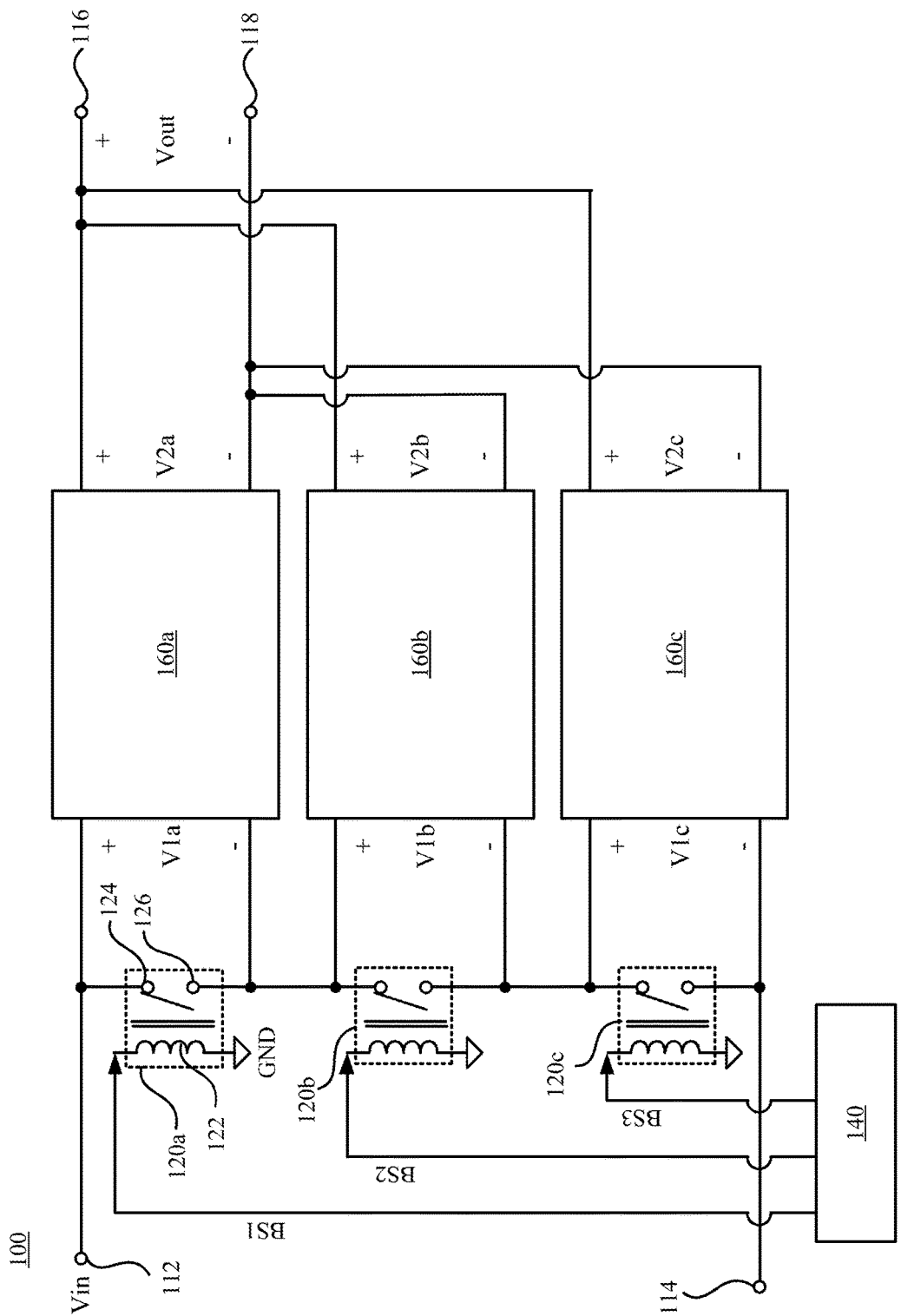
FIG. 1 is a schematic diagram illustrating a power converter according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

The terms "about" and "approximately" in the disclosure are used as equivalents. Any numerals used in this disclosure with or without "about," "approximately," etc. are meant to cover any normal fluctuations appreciated by one of ordinary skill in the relevant art. In certain embodiments, the term "approximately" or "about" refers to a range of values that fall within 20%, 10%, 5%, or less in either direction (greater or less than) of the stated reference value unless otherwise stated or otherwise evident from the context.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a schematic diagram illustrating a power converter 100 according to some embodiments of the present disclosure. The power converter 100 is configured to convert an AC input voltage Vin to a dc output voltage Vout using multiple converting modules 160a, 160b and 160c which may be installed in or removed from the power shelf of the power converter 100. In some embodiments, the input voltage Vin is in the medium voltage level (e.g., 600V-69 kV), and converting modules 160a, 160b and 160c are electrically coupled in series at the input side, and electrically coupled in parallel at the output side, as shown in FIG. 1. Thus, the rating voltage of each converting modules 160a-160c is reduced since the input voltage Vin is shared by voltage V1a, V1b, and V1c received by corresponding converting module. In addition, low voltage semiconductor elements may be used in the converting modules 160a-160c.

As illustratively shown in FIG. 1, the power converter includes input nodes 112 and 114, output nodes 116 and 118, switching circuits 120a-120c, and a control circuit 140. In some embodiments, the switching circuits 120a-120c and the control circuit 140 are arranged in the power shelf of the power converter 100. The input nodes 112 and 114 are configured to receive the input voltage Vin. For example, the input node 112 may be electrically coupled to a phase terminal of a three-phase AC power source (e.g., a power grid), and the input node 114 may be electrically coupled to a neutral terminal of the three-phase AC power source. The output nodes 116 and 118 are electrically coupled to the output side of the power converter 160a-160c and configured to provide the dc output voltage Vout to the loads.

For illustration, the switching circuits 120a-120c are electrically coupled to the converting modules 160a-160c in parallel respectively. Alternatively stated, a first terminal of the switching circuit 120a is coupled to a first terminal at the input side of the converting module 160a, and a second terminal of the switching circuit 120a is coupled to a second terminal at the input side of the converting module 160a. Similarly, the first terminal and the second terminal of the switching circuits 120b and 120c are coupled to the first terminal and the second terminal at the input side of the converting modules 160b and 160c respectively.

In some embodiments, the switching circuits 120a-120c are relays. For example, the switching circuits 120a includes a relay coil 122, and contacts 124 and 126. The relay coil 122 is electrically coupled to the control circuit 140 via a first terminal, and electrically coupled to a ground GND via a second terminal. The contacts 124 and 126 are coupled to the first terminal and the second terminal of the switching circuits 120a respectively. The contacts 124 and 126 are normally open such that the first terminal and the second terminal are electrically separated. When the relay coil 122 is energized, the contacts 124 and 126 are close such that the first terminal and the second terminal are electrically coupled, and the corresponding converting module 160a is bypassed.

The structure of the switching circuits 120b and 120c are similar to the switching circuit 120a, and thus further description are omitted for the sake of brevity. It is noted that the configurations of the switching circuits 120a-120c shown in FIG. 1 and described above are given for illustrative purposes. Various configurations of the switching circuits 120a-120c are within the contemplated scope of the present disclosure, and the switching circuits 120a-120c may be implemented by different types of switches or relays.

In some embodiments, the converting modules 160a-160c may be installed in the power shelf. When the converting modules 160a-160c are installed, the converting modules 160a-160c receive ac voltage V1a, V1b and V1c respectively and convert the ac voltage to dc voltage V2a, V2b, and V2c respectively.

Figure 2:
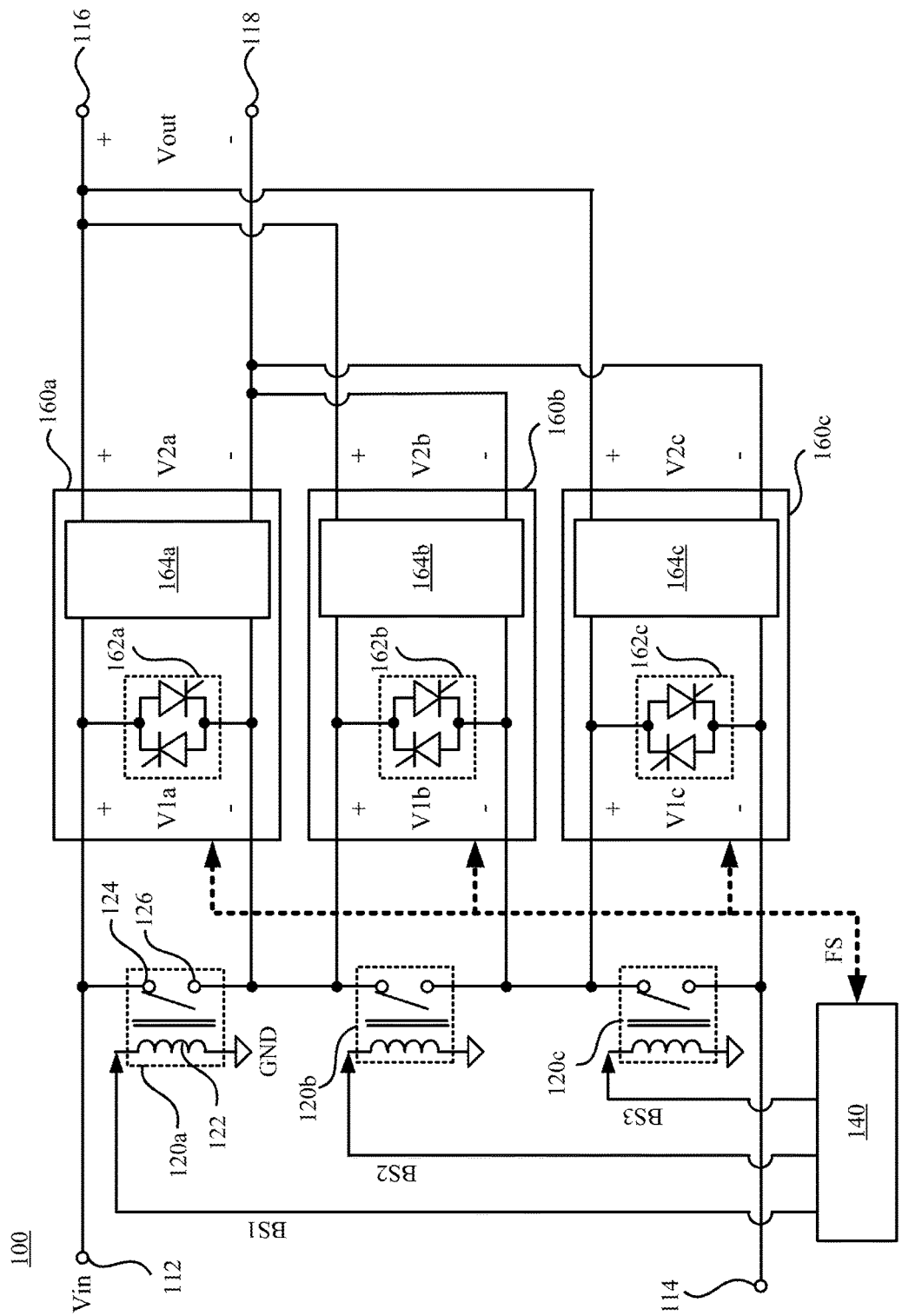
FIG. 2 is a schematic diagram illustrating a power converter according to some embodiments of the present disclosure.

Reference is made to FIG. 2. FIG. 2 is a schematic diagram illustrating a power converter 100 according to some embodiments of the present disclosure. With respect to the embodiments of FIG. 1, like elements in FIG. 2 are designated with the same reference numbers for ease of understanding. For illustration, in some embodiments, each of the converting modules 160a-160c includes a corresponding bypass element (i.e., bypass elements 162a-162c), a corresponding converter element (i.e., converter elements 164a-164c), and a corresponding protect element (not shown).

The bypass elements 162a-162c may be implemented by various semiconductor devices, such as a thyristor, and configured to short the input side of the converting modules 160a-160c such that the voltage V1a-V1c are prevented from flowing through the converter elements 164a-164c when the corresponding converting modules 160a-160c are failed. The converter elements 164a-164c are electrically coupled to the bypass elements 162a-162c respectively and configured to convert the ac voltage V1a-V1c to dc voltage V2a-V2c during the normal operation. Specifically, in some embodiments, the converter elements 164a-164c may be implemented by various switching power supply circuits, such as a buck converter, a flyback converter, a forward converter, or any other suitable power converter circuits known to one skilled in the art. The protect element is configured to detect whether a fault occurs in the corresponding converting modules 160a-160c. When the fault is detected, the protect element shorts the corresponding bypass element 162a-162c and outputs a corresponding fault signal FS to the control circuit 140. Specifically, in some embodiments, the protect element may be implemented by various over-voltage protection circuits, over-current protection circuits, over-temperature protection circuits, other protection circuits known to one skilled in art, or any combinations of the protection circuits mentioned above.

For example, in some embodiments, the protect element may detect whether the input voltage V1a-V1c of the corresponding converting module 160a-160c is larger than a first predetermined value (i.e., an input voltage upper limit), detect whether the output voltage V2a-V2c of the corresponding converting module 160a-160c is larger than a second predetermined value (i.e., an output voltage upper limit), or detect whether a temperature of the corresponding converting module 160a-160c is higher than a predetermined temperature.

The control circuit 140 is electrically coupled to the installed converting modules 160a-160c and the switching circuits 120a-120c. In some embodiments, the control circuit 140 is electrically coupled to the protecting elements of the converting modules 160a-160c so as to receive the fault signal FS from the converting modules 160a-160c, and electrically coupled to the relay coil 122 of the switching modules 120a-120c so as to send the bypass signal BS1-BS3 to the relay coil 122 of the switching modules 120a-120c. In some embodiments, the control circuit 140 may be implemented by a microcontroller, a microprocessor, a digital signal processor (DSP), a microprogrammed control unit (MCU), a field programmable gate array (FPGA) or other similar processing devices known to one skilled in the art. For better understanding of the present disclosure, the operation of the control circuit 140 will be discussed in relation to the method shown in FIG. 3 in the following paragraphs, but is not limited thereto.

Figure 3:
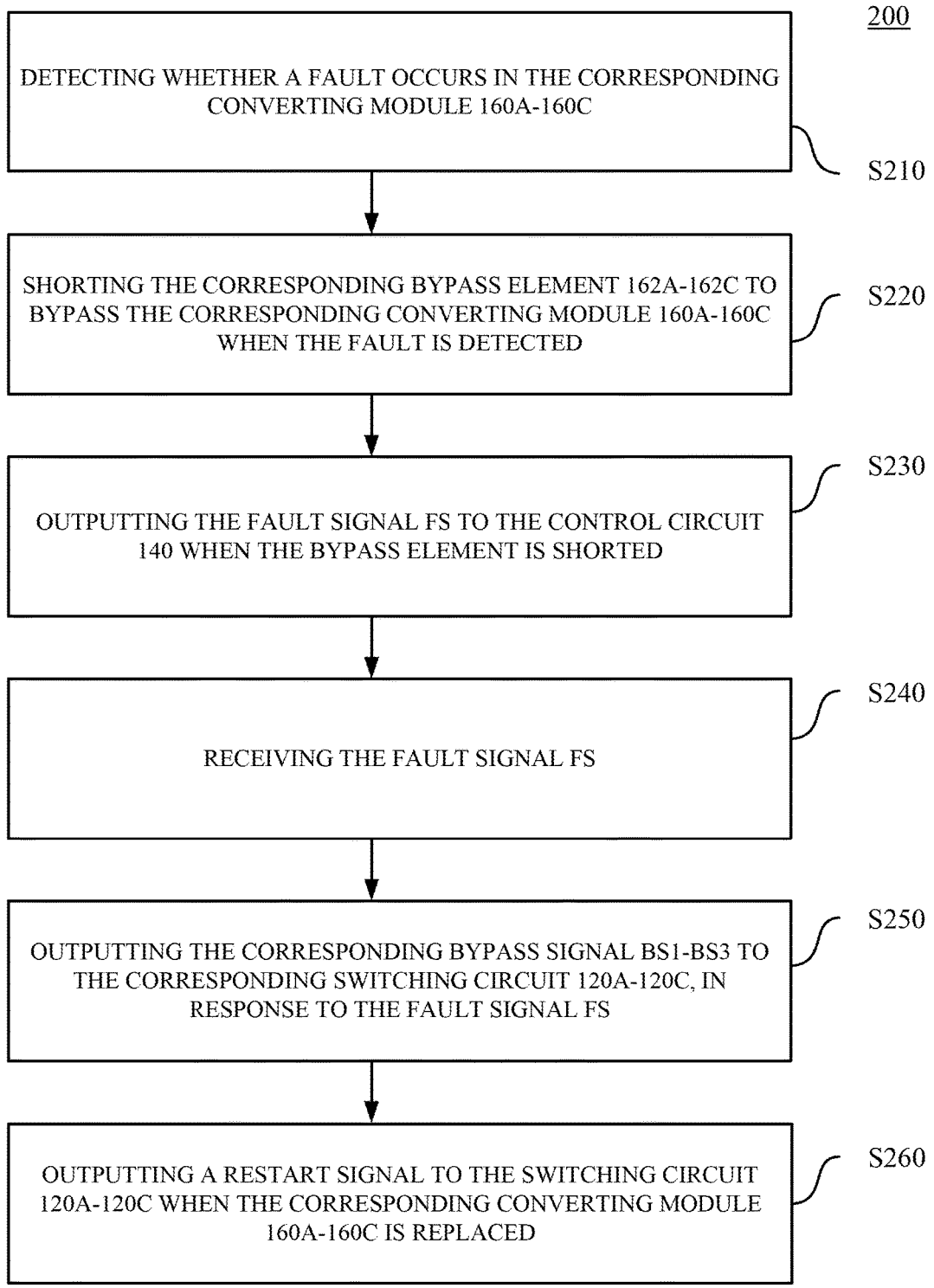
FIG. 3 is a flowchart illustrating a method of operating the power converter shown in FIG. 1 according to some embodiments of the present disclosure.

Reference is made to FIG. 3. FIG. 3 is a flowchart illustrating a method 200 of the operation of the power converter 100 shown in FIG. 2 in accordance with some embodiments of the present disclosure. The operations of the power converter 100 in FIG. 2 are also described below by the method 200 illustrated in FIG. 3. For illustration, the method 200 includes operations S210, S220, S230, S240, and S250. It is noted that the method 200 is discussed in accordance to the power converter 100 shown in FIG. 2 only for illustrative purpose, and not meant to limit the present disclosure. With respect to the embodiments of FIG. 2, like elements in FIG. 3 are designated with the same reference numbers for ease of understanding.

First, in operation S210, the protecting elements of the converting module 160a-160c detect whether a fault occurs in the corresponding converting module 160a-160c. For example, the protecting elements may detect the input voltage V1a-V1c, the output voltage V2a-V2c, and the temperature of the converting module 160a-160c as mentioned in the above paragraph. It is noted that the protecting elements may perform over-current protection, over-voltage protection, over-temperature protection, or other protection known to one skilled in the art.

Next, in operation S220, when the fault is detected, the bypass element 162a-162c in the converting module 160a-160c is shorted automatically to bypass the corresponding converting module 160a-160c. For example, if the protecting element in the converting module 160a detects the fault occurs and the temperature of the converting module 160a is over the upper limit, the protecting element activates the bypass element 162a to be shorted. Thus, the current flowing in the converting module 160a will pass through the bypass element 162a and no current flows in the converter element 164a.

Next, in operation S230, when the bypass element is shorted, the protecting element outputs the fault signal FS to the control circuit 140. For example, when the bypass element 162a is activated and shorted, the corresponding converting module 160a sends the fault signal FS to the control circuit via the protecting element.

Next, in operation S240, the control circuit 140 receives the fault signal FS, which indicates the converting module (e.g., converting module 160a) of which the fault occurred.

Next, in operation S250, in response to the received fault signal FS, the control circuit 140 outputs the corresponding bypass signal BS1-BS3 to the switching circuit 120a-120c electrically coupled to the corresponding converting module 160a-160c in parallel, so as to short the switching circuit 120a-120c. For example, when the fault signal FS indicates the converting module 160a is bypassed due to the fault, the control circuit 140 outputs the bypass signal BS1 to the switching circuit 120a to short the switching circuit 120a. For example, in some embodiments, the relay coil 122 in the switching circuit 120a is energized in response to the bypass signal BS1, and the contacts 124 and 126 are close accordingly.

Since the switching circuit 120a is shorted when the corresponding converting module 160a is failed, the voltage V1a between the input side of the converting module 160a is substantially zero. Thus, no current flows into the converting module 160a, and an operator can remove and replace the failed converting module 160a safely.

In some embodiments, since the numbers of the converter modules are designed for the redundancy, the input voltage Vin may be shared by the voltage V1b and V1c, which are received by the remaining normal converting module 160b and 160c, and thus the converter 100 may still operate and perform power conversion so as to output the dc output voltage Vout with converting module 160b and 160c.

In some embodiments, the method 200 further includes operation S260. In operation S260, the control circuit 140 outputs a restart signal to the switching circuit 120a-120c when the corresponding converting module 160a-160c is replaced, so as to open the switching circuit 120a-120c again. For example, when a new converting module is installed to replace the failed converting module 160a, the control circuit 140 outputs the restart signal to the switching circuit 120a to de-energize the relay coil 122, and the contacts 124 and 126 are back to normally open state.

In some embodiments, the power converter 100 is shutdown momentarily and restarted again after the failed converting module is replaced. An extra power source such as a battery may be arranged and electrically coupled to the output node 116 and 118 so as to supply output voltage Vout when restarting the power converter 100. In some other embodiments, the new converting module may perform power conversion directly when the corresponding switching circuit opens again, without restarting the power converter 100 to achieve the non-interrupted power supply.

The above illustrations include exemplary operations, but the operations are not necessarily performed in the order shown. Operations may be added, replaced, changed order, and/or eliminated as appropriate, in accordance with the spirit and scope of various embodiments of the present disclosure.

It is noted that the number of the switching circuits and the converting modules shown in the embodiments of FIG. 1 and FIG. 2 are given for illustrative purpose and may be simplified for the convenience of explanation. One skilled in the art may modify the power converter 100 with more switching circuits and converting modules without departing from the scope or spirit of the disclosure. For example, in some embodiments, the power converter 100 may perform power conversion normally with more than one converting modules bypassed by corresponding switching circuits, as long as the remaining converting modules are able to withstand the input voltage Vin.

Figure 4:
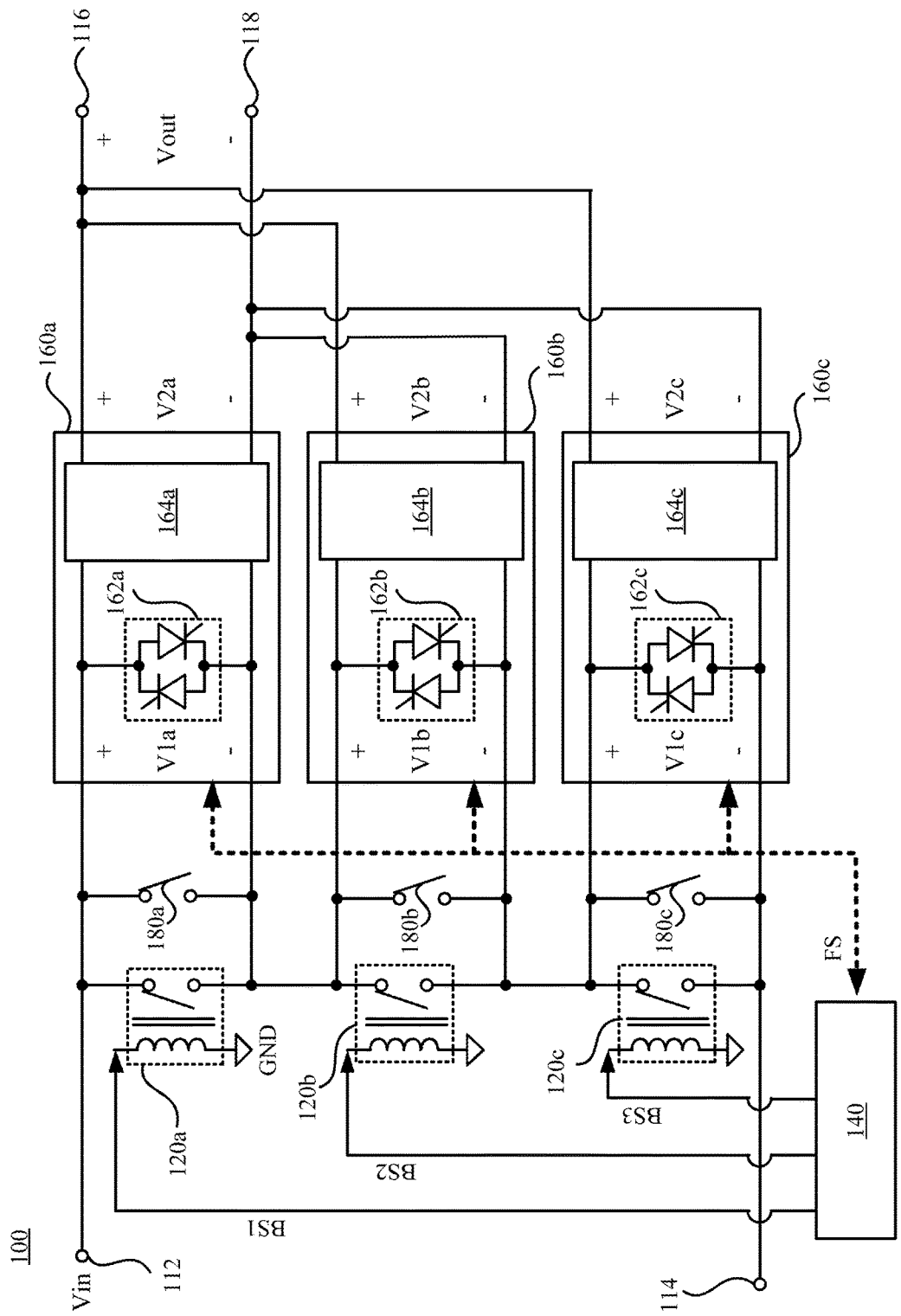
FIG. 4 is a schematic diagram illustrating a power converter according to some embodiments of the present disclosure.

Reference is made to FIG. 4. FIG. 4 is a schematic diagram illustrating a power converter 100 according to some embodiments of the present disclosure. With respect to the embodiments of FIG. 2, like elements in FIG. 4 are designated with the same reference numbers for ease of understanding. Compared to the embodiments of FIG. 2, the power converter 100 shown in FIG. 4 further includes mechanical latches 180a, 180b and 180c.

As illustratively shown in FIG. 4, each of the latches 180a-180c is connected in parallel to the corresponding switching circuit 120a-120c. Specifically, the latch 180a is connected in parallel to the switching circuit 120a, the latch 180b is connected in parallel to the switching circuit 120b, and the latch 180c is connected in parallel to the switching circuit 120c. The latches 180a-180c are arranged in the power shelf of the power converter 100. When an operator removes the failed power module from the power shelf, the corresponding latches 180a-180c are shorted correspondingly to ensure no current flows through the failed power module. Thus, the operator's safety during the replacing process is guaranteed even if the switching circuit 120a-120c fails to be closed properly.

Figure 5:
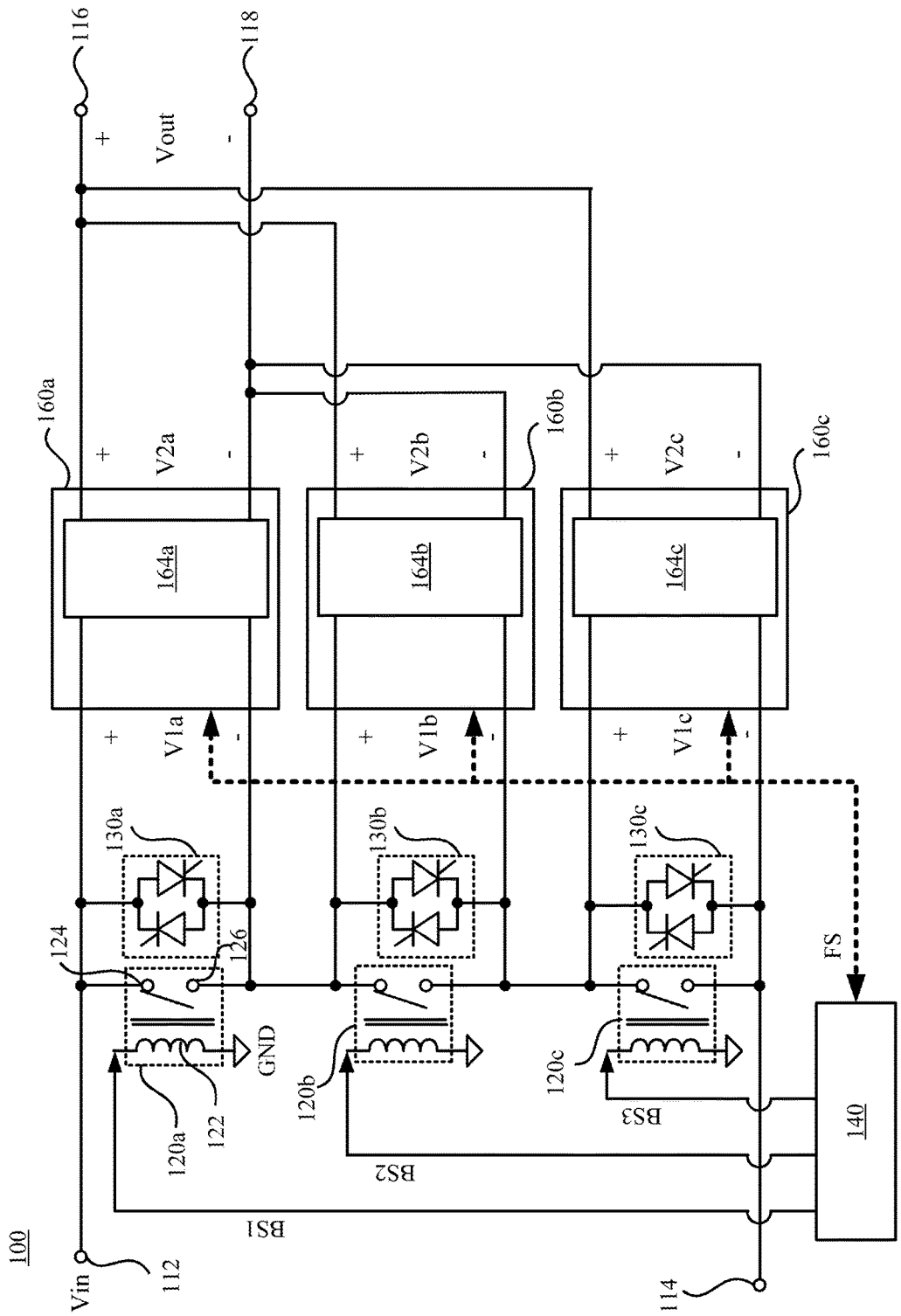
FIG. 5 is a schematic diagram illustrating a power converter according to some embodiments of the present disclosure.

Reference is made to FIG. 5. FIG. 5 is a schematic diagram illustrating a power converter 100 according to some embodiments of the present disclosure. With respect to the embodiments of FIG. 2, like elements in FIG. 5 are designated with the same reference numbers for ease of understanding. Compared to the embodiments of FIG. 2, the bypass element 162a-162c are omitted from the converting modules 160a-160c respectively.

On the other hands, the bypass circuits 130a-130c are arranged in the power shelf of the power converter 100. Specifically, in some embodiments, the bypass circuits 130a-130c are electrically coupled to the converting modules 160a-160c in parallel respectively. Alternatively stated, a first terminal of the bypass circuit 130a is coupled to a first terminal at the input side of the converting module 160a, and a second terminal of the bypass circuit 130a is coupled to a second terminal at the input side of the converting module 160a. Similarly, the first terminal and the second terminal of the bypass circuits 130b and 130c are coupled to the first terminal and the second terminal at the input side of the converting modules 160b and 160c respectively.

In addition, as illustratively shown in FIG. 5, each of the bypass circuits 130a-130c is connected in parallel to the corresponding switching circuit 120a-120c. Specifically, the bypass circuit 130a is connected in parallel to the switching circuit 120a, the bypass circuit 130b is connected in parallel to the switching circuit 120b, and the bypass circuit 130c is connected in parallel to the switching circuit 120c.

Similar to the embodiments mentioned above, the bypass circuits 130a-130c may be implemented by various semiconductor devices, such as a thyristor, and configured to short the input side of the converting modules 160a-160c such that the voltage are prevented from flowing through the converting modules 160a-160c when the converting modules 160a-160c are failed. Alternatively stated, when the fault is detected, the protect element shorts the corresponding bypass circuit 130a-130c and outputs the corresponding fault signal FS to the control circuit 140. Specifically, in some embodiments, the protect element may be implemented by various over-voltage protection circuits, over-current protection circuits, over-temperature protection circuits, other protection circuits known to one skilled in art, or any combinations of the protection circuits mentioned above. The operations of the bypass circuit 130a-130c are discussed in details in the aforementioned embodiments and thus are omitted herein for the sake of brevity.

By moving the bypass circuits 160a-160c from the converting modules 160a-160c to the power shelf, the volume of the converting modules 160a-160c may be reduced and the design of the converting modules 160a-160c may be simplified. Thus, the manufacturing cost of the converting modules 160a-160c is lowered, while the operator's safety during the replacing process is still guaranteed by the operations of the switching circuit 120a-120c and the bypass circuits 160a-160c arranged in the power shelf.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power converter, comprising:
 a plurality of converting modules, wherein each of the converting modules comprises a bypass element configured to be shorted when a fault occurs; and
 a plurality of switching circuits electrically coupled in series to each other and electrically coupled in parallel to the converting modules respectively, wherein any one of the switching circuits is configured to be shorted when the bypass element of the corresponding converting module is shorted.

2. The power converter of claim 1, wherein each of the converting modules comprises an input terminal and an output terminal, the switching circuits are electrically coupled to the input terminals of the corresponding converting modules that are electrically coupled in series, and the output terminals of the converting modules are electrically coupled in parallel to each other.

3. The power converter of claim 2, wherein the converting modules are configured to receive an ac input voltage via the input terminals, and convert the ac input voltage to output a dc output voltage via the output terminals.

4. The power converter of claim 1, further comprising:
 a control circuit electrically coupled to the switching circuits and the converting module, and configured to output a bypass signal to short the corresponding switching circuit, in response to a fault signal indicating the fault received from the corresponding converting module.

5. The power converter of claim 1, further comprising:
 a plurality of latches, wherein each of the latches is connected in parallel to the corresponding switching circuit.

6. The power converter of claim 1, wherein each of the switching circuits comprises a relay having a coil, a first contact and a second contact, wherein the first contact and the second contact are normally-open.

7. The power converter of claim 6, wherein the coil of the relay is electrically coupled between the control circuit and a ground.

8. The power converter of claim 1, wherein each of the converting modules further comprises a protecting element, and the protecting element is configured to short the bypass element in the corresponding converting module and output a fault signal indicating the fault.

9. A power converter, comprising:
 a first converting module;
 a second converting module electrically coupled to the first converting module; and
 a power converter shelf comprising:
 a first switching circuit electrically coupled to the first converting module in parallel;
 a second switching circuit electrically coupled to the second converting module in parallel and electrically coupled to the first switching circuit in series; and
 a control circuit configured to output a bypass signal to turn on the first switching circuit when the first converting module outputs a fault signal to the control circuit, and output the bypass signal to turn on the second switching circuit when the second converting module outputs the fault signal to the control circuit.

10. The power converter of claim 9, wherein each of the first converting module and the second converting module comprises a bypass element and a protecting element, wherein when the protecting element detects a fault occurred, the bypass element is configured to be closed and the protecting element is configured to output the fault signal to the control circuit.

11. The power converter of claim 9, wherein input terminals of the first converting module and of the second converting module are electrically coupled in series, and output terminals of the first converting module and of the second converting module are electrically coupled in parallel.

12. The power converter of claim 11, wherein each of the first converting module and the second converting module is configured to receive an ac input voltage via the corresponding input terminal, and convert the input voltage to output a dc output voltage via the corresponding output terminal.

13. The power converter of claim 9, wherein the power converter shelf further comprises:
a first latch connected in parallel to the first switching circuit; and
a second latch connected in parallel to the second switching circuit.

14. The power converter of claim 9, wherein each of the first switching circuit and the second switching circuit comprises a relay having a coil, a first contact and a second contact, wherein the first contact and the second contact are normally-open.

15. The power converter of claim 14, wherein the coil of the relay is electrically coupled between the control circuit and a ground.

16. A method, comprising:
receiving a fault signal, by a control circuit, from one of a plurality of converting modules; and
outputting a bypass signal, by the control circuit, in response to the fault signal to a switching circuit electrically coupled to the corresponding converting module in parallel so as to short the switching circuit, wherein the control circuit and the switching circuits are arranged in a power shelf, and the converting modules are installed in the power shelf.

17. The method of claim 16, further comprising:
detecting whether a fault occurs, by a protecting element in the converting module;
bypassing the corresponding converting module, by shorting a bypass element in the converting module when the fault is detected; and
outputting the fault signal, by the protecting element, to the control circuit when the bypass element is shorted.

18. The method of claim 17, wherein detecting whether the fault occurs comprises detecting whether an input voltage of the converting module is larger than a first predetermined value, detecting whether an output voltage of the converting module is larger than a second predetermined value, or detecting whether a temperature of the converting module is higher than a predetermined temperature.

19. The method of claim 16, further comprising:
outputting a restart signal, by the control circuit, to the switching circuit when the corresponding converting module is replaced, so as to open the switching circuit.

20. The method of claim 16, wherein each of the switching circuits comprises a relay having a coil, a first contact and a second contact, and shorting the switching circuit comprises:
energizing the coil in response to the bypass signal so as to close the first contact and the second contact, wherein the first contact and the second contact are normally-open.

* * * * *